United States Patent
Epping et al.

(10) Patent No.: US 11,144,219 B2
(45) Date of Patent: Oct. 12, 2021

(54) ENSURING SUFFICIENT AVAILABLE STORAGE CAPACITY FOR DATA RESYNCHRONIZATION/RECONSTRUCTION IN A HYPER-CONVERGED INFRASTRUCTURE

(71) Applicant: VMware, Inc., Palo Alto, CA (US)

(72) Inventors: Duncan Epping, Helmond (NL); Cormac Hogan, Cork (IE); Frank Denneman, Purmerend (NL)

(73) Assignee: VMware, Inc., Palo Alto, CA (US)

( * ) Notice: Subject to any disclaimer, the term of this patent is extended or adjusted under 35 U.S.C. 154(b) by 116 days.

(21) Appl. No.: 16/550,050

(22) Filed: Aug. 23, 2019

(65) Prior Publication Data

US 2021/0055872 A1    Feb. 25, 2021

(51) Int. Cl.
*G06F 3/06* (2006.01)
*G06F 9/455* (2018.01)

(52) U.S. Cl.
CPC .......... *G06F 3/0631* (2013.01); *G06F 3/0614* (2013.01); *G06F 3/0632* (2013.01); *G06F 3/0655* (2013.01); *G06F 3/0673* (2013.01); *G06F 9/45558* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 9,830,082 B1 | 11/2017 | Srinivasan et al. | |
| 10,599,512 B2 * | 3/2020 | Aiyar | G06F 11/0709 |
| 2008/0189468 A1 * | 8/2008 | Schmidt | G06F 11/2046 |
| | | | 711/6 |
| 2009/0177918 A1 * | 7/2009 | Abali | G06F 11/1092 |
| | | | 714/6.32 |
| 2010/0077250 A1 * | 3/2010 | Koh | H04L 41/06 |
| | | | 714/4.1 |
| 2014/0059379 A1 * | 2/2014 | Ren | G06F 11/2069 |
| | | | 714/15 |
| 2016/0098297 A1 * | 4/2016 | Yuyitung | G06F 11/3447 |
| | | | 718/104 |

(Continued)

OTHER PUBLICATIONS

International Search Report and Written Opinion issued in PCT Application No. PCT/US2020/047333, dated Dec. 7, 2020, 14 pages.

*Primary Examiner* — Kaushikkumar M Patel

(57) ABSTRACT

Techniques for ensuring sufficient available storage capacity for data resynchronization or data reconstruction in a cluster of a hyper-converged infrastructure (HCI) deployment are provided. In one set of embodiments, a computer system can receive a request to provision or reconfigure an object on the cluster. The computer system can further calculate one or more storage capacity reservations for one or more host systems in the cluster, where the one or more storage capacity reservations indicate one or more amounts of local storage capacity to reserve on the one or more host systems respectively in order to ensure successful data resynchronization or data reconstruction in the case of a host system failure or maintenance event. If placement of the object on the cluster will result in a conflict with the one or more storage capacity reservations, the computer system can deny the request to provision or reconfigure the object.

21 Claims, 7 Drawing Sheets

(56) References Cited

U.S. PATENT DOCUMENTS

2018/0260125 A1 9/2018 Bates et al.
2019/0012211 A1 1/2019 Selvaraj
2019/0179564 A1 6/2019 Bernat et al.

* cited by examiner

ENSURING SUFFICIENT AVAILABLE STORAGE CAPACITY FOR DATA RESYNCHRONIZATION/RECONSTRUCTION IN A HYPER-CONVERGED INFRASTRUCTURE

BACKGROUND

Hyper-converged infrastructure (HCI) is an IT infrastructure model in which both the compute and storage resources of a cluster of physical servers (i.e., host systems) are virtualized at the hypervisor level. In a typical HCI deployment, when a host system fails or is taken offline for maintenance, the data maintained on the local storage resources of that host system is resynchronized or reconstructed on other, available host systems in the cluster. However, with existing HCI implementations, it is generally not possible to reserve storage capacity within the cluster in a manner that ensures this resynchronization/reconstruction process will complete successfully. Thus, the process may fail at some point due to insufficient available storage resources. Depending on the amount of data being resynchronized or reconstructed, this failure may occur hours, or even days, after the process was initiated, which means that the compute power and I/O bandwidth dedicated to running the process during that time period will have been wasted.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure are directed to techniques, collectively referred to as "storage capacity admission control," which ensure that a cluster of an HCI deployment will have sufficient available storage capacity to successfully resynchronize or reconstruct data (e.g., objects/components) across the cluster upon the occurrence of a host failure or maintenance event.

At a high level, these techniques involve calculating, at a time of receiving a request to provision or reconfigure an object, an amount of storage capacity to be reserved on each host system of the cluster for resynchronization/reconstruction purposes. The provisioning/reconfiguration request can then be validated against the per-host storage reservations based on the object's requested storage size and/or other criteria (e.g., the object's storage policy). If the object can be placed in the cluster without conflicting with the per-host storage reservations, the provisioning/reconfiguration request can be allowed, thereby "admitting" the object into the cluster's virtual storage pool. On the other hand, if the object cannot be placed in the cluster without conflicting with the per-host storage reservations, the provisioning/reconfiguration request can be denied. This advantageously guarantees that the calculated storage reservation amount on each host will be available for successfully resynchronizing or reconstructing data across the cluster if needed.

2. Example HCI Deployment

Figure 1:
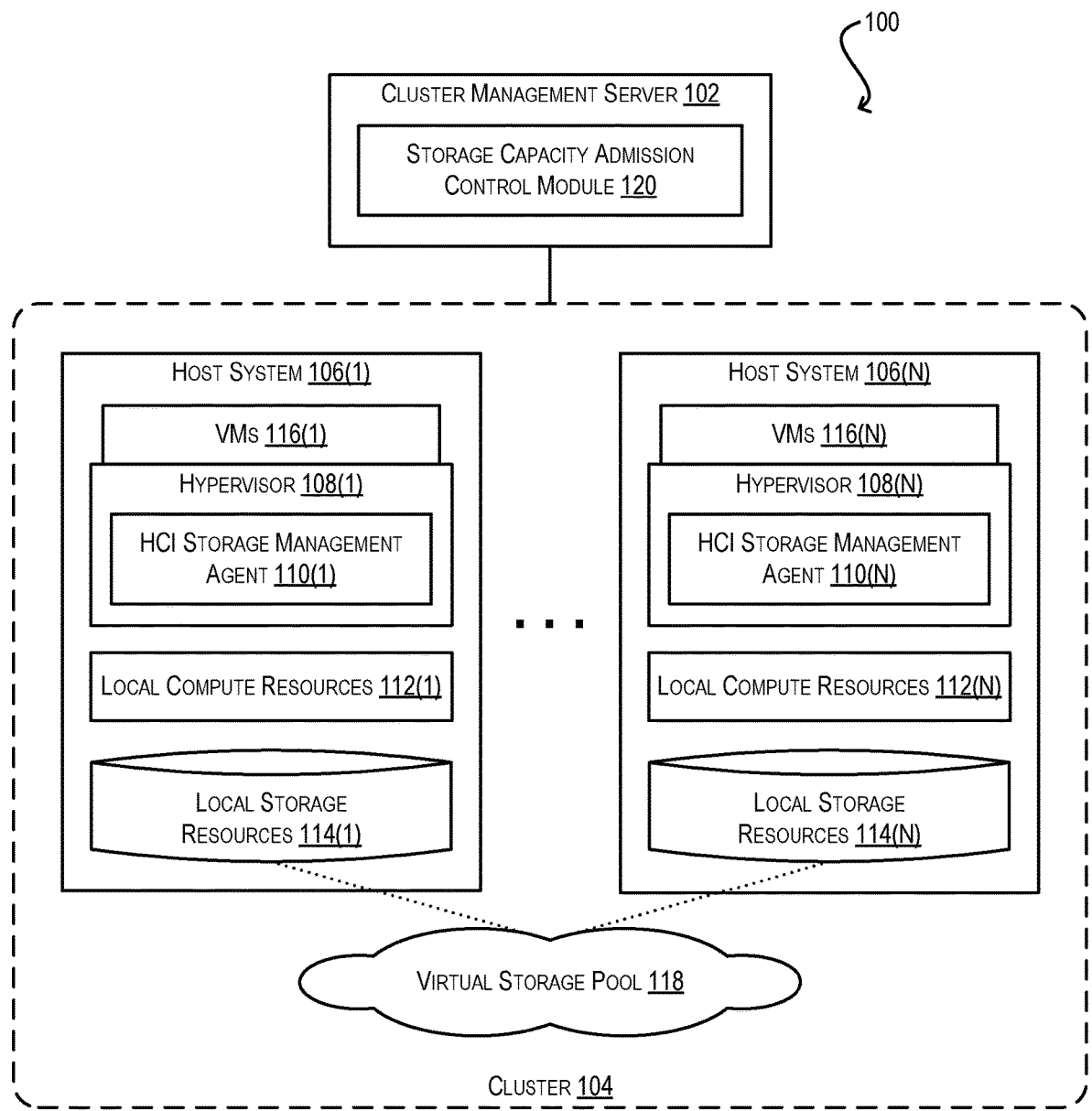
FIG. 1 depicts an example HCI deployment according to certain embodiments.

FIG. 1 is a simplified block diagram of an HCI deployment 100 that implements the techniques of the present disclosure according to certain embodiments. As shown, HCI deployment 100 comprises a cluster management server 102 that is communicatively coupled with a cluster 104 of host systems 106(1)-(N). Each host system 106 includes a hypervisor 108 with an HCI storage management agent 110, a set of local compute resources 112 (e.g., central processing units (CPUs)), and a set of local storage resources 114 (e.g., directly-attached solid state disks (SSDs), spinning hard disks, non-volatile memory (NVM), etc.).

Hypervisors 108(1)-(N) are configured to virtualize the local compute resources of their respective host systems and allocate the virtualized compute resources to locally-running virtual machines (VMs) 116(1)-(N). HCI storage management agents 110(1)-(N) residing within hypervisors 108(1)-(N) are configured to aggregate the local storage resources of their respective host systems into a cluster-wide virtual storage pool 118 and make virtual storage pool 118 available to VMs 116(1)-(N) for data storage purposes. In a particular embodiment, hypervisors 108(1)-(N) can be instances of the ESXi hypervisor developed by VMware, Inc., HCI storage management agents 110(1)-(N) can be instances of VMware's vSAN (virtual SAN) agent, and cluster management server 102 can be an instance of VMware's vCenter Server.

Figure 2:
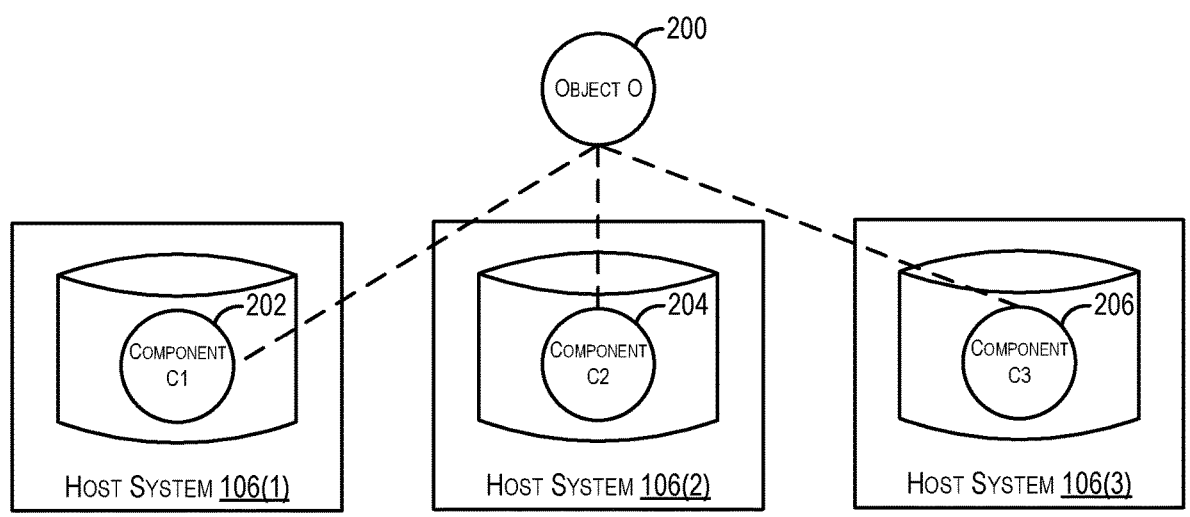
FIG. 2 depicts an example object according to certain embodiments.

Generally speaking, HCI storage management agents 110(1)-(N) manage the storage of data within virtual storage pool 118 (and thus, across local storage resources 114(1)-(N) of host systems 106(1)-(N)) in the form of logical data volumes known as objects. Each object, in turn, is composed of one or more components, which can be understood as sub-objects that contain some portion of the data and/or metadata of its parent object. The components of an object are structured as a tree, with the components sitting at the leaf nodes of the tree. For instance, FIG. 2 depicts a tree for an example object O (reference numeral 200) which may correspond to, e.g., a VM namespace object, a VM disk file (VMDK), or any other type of file/object maintained by cluster 104. In this example, object O is composed of three components C1 (reference numeral 202), C2 (reference numeral 204), and C3 (reference numeral 206) that are stored on the local storage resources of host systems 106(1), 106(2), and 106(3) respectively.

Objects can be associated with storage policies that define certain requirements regarding the object's characteristics/structure and how the components of the object may be stored/distributed across the cluster. For example, given the tree configuration shown in FIG. 2, object 200 may be associated with a storage policy indicating that each component 202/204/206 of the object must be a mirrored copy of the others (e.g., employ RAID-1) and be stored on a different host system—or in other words, fault domain—of the cluster for fault tolerance/high availability purposes. These storage policies can be defined on a per-object basis or with respect to storage object "owners" (e.g., VMs). In the latter case, the storage policies defined for a given owner can be automatically applied to all storage objects owned/created by that entity.

As noted in the Background section, when a host system fails or is brought offline for maintenance in an HCI cluster such as cluster 104 of FIG. 1, the data (e.g., storage objects and/or constituent components) maintained on the local storage resources of that host system are typically resynchronized or reconstructed on other available host systems in the cluster. "Resynchronization" refers to the process of copying an absent object/component (i.e., an object/component stored on the failed/offline host system) to another host system from an available mirror copy (e.g., a RAID-1 copy). "Reconstruction" refers to the process of recreating a new copy of an absent object/component on another host system using available parity data (per, e.g., a RAID-5 or RAID-6 configuration). Thus, both resynchronization and reconstruction can be understood as methods for rebuilding absent storage objects/components within the cluster so that those objects/components remain (1) fully accessible to the still-operational host systems in the cluster and (2) in compliance with their respective storage policies.

Because resynchronization and reconstruction involve the movement and/or creation of data across cluster host systems, these operations require some amount of free storage capacity on those host systems in order to complete successfully. However, existing HCI implementations generally do not provide any mechanism for reserving storage capacity in the cluster for this purpose. Instead, a "best efforts" approach is usually employed where, upon the occurrence of a host failure or maintenance event, an administrator will take a guess at the amount of available storage capacity needed to support resynchronization/reconstruction and, assuming this guess is below the currently available storage capacity, initiate the process. If it turns out that the guess is incorrect, the resynchronization/reconstruction process will fail while in-flight once the cluster's available storage resources are exhausted. This failure may occur several hours or days after the process was started, resulting in both wasted time and effort in terms of, e.g., compute and I/O bandwidth resources consumed.

To address the foregoing and other similar problems, cluster 104 of FIG. 1 is enhanced to include a novel storage capacity admission control module 120 in accordance with certain embodiments. Although storage capacity admission control module 120 is shown in FIG. 1 as being a part of cluster management server 102, in alternative embodiments some or all of the functionality attributed to this module may be implemented in other entities in HCI deployment 100/cluster 104, such as within each hypervisor 108 of host systems 106(1)-(N).

Generally speaking, storage capacity admission control module 120 can regulate the entry, or admission, of objects into cluster 104's virtual storage pool 118 by (1) calculating, based on one or more user-defined failure tolerance parameters, per-host storage reservations that ensure data resynchronization/reconstruction within cluster 104 can complete successfully, and (2) validating, for each object to be admitted (e.g., provisioned or reconfigured), whether the object can be placed in cluster 104 in view of the calculated per-host storage reservations. If the answer to (2) is no, storage capacity admission control module 120 can block the object from being provisioned/reconfigured, thereby preserving the reserved storage amount on each host for any resynchronization/reconfiguration that may be needed.

In various embodiments, the particular manner in which storage capacity admission control module 120 calculates the per-host storage reservations can differ. For instance, in one set of embodiments (referred to as the "host-level" approach and detailed in section (3) below), storage capacity admission control module 120 can receive as input a user-defined host failover capacity (HFC) parameter that indicates the total number of host failures that may be tolerated in cluster 104. Module 120 can then derive the per-host storage reservations based on this HFC parameter (and other information such as the total number of host systems in the cluster and the raw storage capacity of each host system) and can validate to-be-admitted objects using these reservations.

In another set of embodiments (referred to as the "object-level" approach and detailed in section (4) below), storage capacity admission control module 120 can receive as input, for each object O to be admitted, a user-defined failures to tolerate (FTT) parameter that indicates the total number of failures that may be tolerated with respect to that particular object O. This FTT parameter may be defined in, for example, the object's associated storage policy. Module 120 can then derive the per-host storage reservations based on this FTT parameter (and other information such as the object's requested size and RAID configuration) and can validate object O using these reservations.

It should be appreciated that HCI deployment 100 of FIG. 1 is illustrative and not intended to limit embodiments of the present disclosure. For example, as mentioned previously, the functionality of storage capacity admission control module 120 is not solely restricted to being implemented on cluster management server 102; depending on the nature of the HCI deployment and/or use case, some or all of the functionality attributed to module 120 may be implemented on or within other entities, such as within HCI storage management agents 110(1)-(N) of host systems 106(1)-(N). Further, the various entities shown in FIG. 1 may include sub-components and/or implement functions that are not specifically described. One of ordinary skill in the art will recognize other variations, modifications, and alternatives.

3. Host-Level Approach

Figure 3:
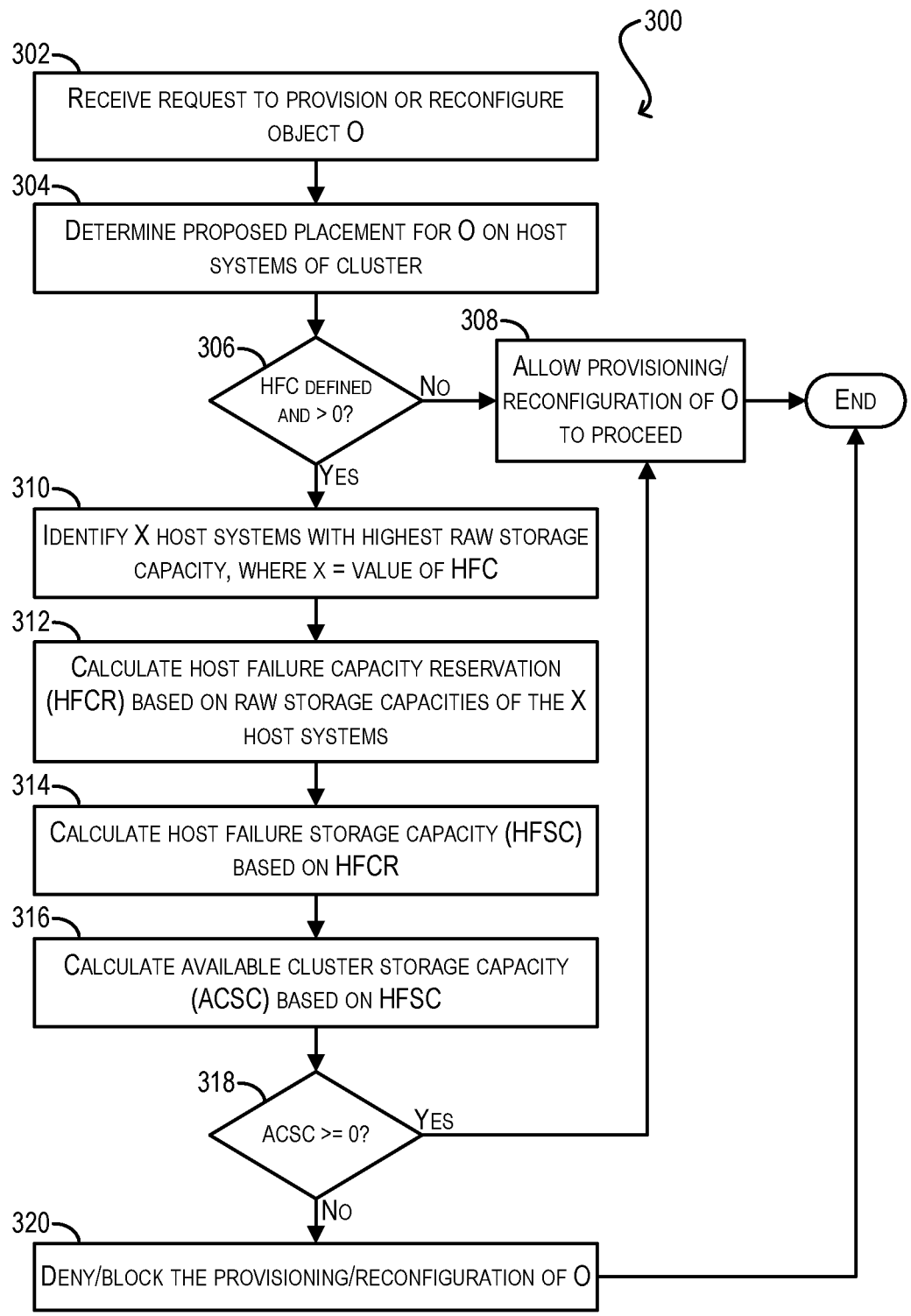
FIG. 3 depicts a workflow for implementing storage capacity admission control using a host-level approach according to certain embodiments.

FIG. 3 depicts a workflow 300 that may be executed by storage capacity admission control module 120 of FIG. 1 for validating the admittance of a given object O into cluster 104's virtual storage pool 118 using the host-level approach according to certain embodiments. Object O may be, e.g., a VM namespace object, a VMDK object, or any other type of object (e.g., performance database, iSCSI target, LUN (logical unit number), etc.) supported by HCI deployment 100.

Starting with blocks 302 and 304, a request to provision or reconfigure object O can be received and a proposed placement for object O (and its constituent components) on the host systems of cluster 104 can be determined based on O's requested storage size and its storage policy. For example, if object O is composed of three components C1, C2, and C3 like object 200 of FIG. 2 and is associated with a storage policy requiring a RAID-1 configuration and a separate fault domain for each mirrored component, component C1 may be placed on the local storage resources of host system 106(1), component C2 may be placed on the local storage resources of host system 106(2), and component C3 play be placed on the local storage resources of host system 106(3). As used herein, a request to "provision" an object refers to a request to allocate or create the object in the cluster's storage pool, and a request to "reconfigure" an object refers to a request to modify the object in some manner that affects its storage size/footprint in the cluster's storage pool.

At block 306, storage capacity admission control module 120 can check whether a host failover capacity (HFC) parameter has been defined for cluster 104 and is greater than zero. In various embodiments, this HFC parameter may be defined by, e.g., an administrator of HCI deployment 100/cluster 104 and specifies the number of host system failures that cluster 104 should be able to tolerate and recover from via resynchronization/reconstruction. Stated another way, the HFC parameter identifies the number of host systems 106 in cluster 104 that can fail or go offline while still allowing all of the objects locally stored on those failed host systems to be successfully resynchronized or reconstructed on other available host systems (in compliance with their respective storage policies). Assuming a maximum of M possible host systems in cluster 104, the value of the HFC parameter can range from 1 to M−1.

If the answer at block 306 is no, no validation of the provisioning/reconfiguration request is needed. Accordingly, storage capacity admission control module 120 can allow the provisioning/reconfiguration of object O to proceed (block 308) and workflow 300 can end.

However, if the answer at block 306 is yes, storage capacity admission control module 120 can carry out a sub-process for validating the provisioning/reconfiguration request. In particular, at block 310, storage capacity admission control module 120 can identify the X host systems in cluster 104 with the highest raw storage capacity, where X corresponds to the received HFC parameter value. This identification can involve, e.g., sorting the host systems by their respective raw storage capacities in a descending order and selecting the first X host systems in the sorted list, or alternatively sorting the host systems by their respective raw storage capacities in an ascending order and selecting the last X host systems in the sorted list.

For example, assume that the received HFC parameter value is 2 and there are 6 total host systems H1-H6 having raw storage capacities of 40 TB, 40 TB, 40 TB, 40 TB, 60 TB, and 70 TB respectively. In this scenario, module 120 will identify host systems H6 and H5 as being the two host systems with the highest raw storage capacities in the cluster (i.e., 70 GB and 60 GB respectively).

At block 312, storage capacity admission control module 120 can calculate a host failure capacity reservation (HFCR) parameter based on the HFC parameter. In various embodiments, this HFCR parameter specifies the storage capacity to be reserved per host system 106 in cluster 104 to ensure storage availability for successful resynchronization/reconstruction if one or more of the host systems fail (up to the HFC parameter value). In a particular embodiment, this HFCR parameter can be calculated as follows:

$$HFCR = ((1/N \times C_1) + (1/N \times C_2) + \ldots (1/N \times C_X))$$ Listing 1

In the equation above, N is the number of host systems in cluster 104 and $C_1 \ldots C_X$ are the raw storage capacities of the top X host systems with the highest raw storage capacities, per the HFC parameter value. Thus, in the previous example where the cluster comprises six host systems H1-H6 with capacities 40 TB, 40 TB, 40 TB, 40 TB, 60 TB, and 70 TB respectively and where X=2, the value of the calculated HFCR value will be (⅙×70 TB=11.66 TB)+(⅙×60 TB=10 TB)=21.66 TB.

Further, at block 314, storage capacity admission control module 120 can calculate a host failover storage capacity (HFSC) parameter which specifies the total amount of storage capacity to be reserved across cluster 104, in accordance with the HFCR parameter. The HFSC parameter can be calculated as HFCR x N where N is the number of host systems, or alternatively as $C_1 + C_2 + \ldots C_X$.

Once storage capacity admission control module 120 has calculated HFCR and HFSC, module 120 can calculate the available cluster storage capacity (ACSC) for cluster 104 as (total consumable cluster storage capacity−HFSC)−used cluster storage capacity, where the total consumable cluster storage capacity is the summation of the raw storage capacities of the host systems in the cluster (minus some amount to take into account file system overheads) and where used cluster storage capacity is the storage capacity in the cluster that is currently being consumed by deployed objects (block 316). The used cluster storage capacity parameter is assumed to take into account the proposed placement of object O on cluster 104 per block 304.

Storage capacity admission control module 120 can then check whether the value of the ACSC parameter is greater than or equal to zero (block 318). If so, module 120 can conclude that there is sufficient available storage capacity for admitting object O in view of the reserved storage capacity and can allow the provisioning/reconfiguration of O to proceed per previously identified block 308.

On the other hand, if storage capacity admission control module 120 determines that the value of the ACSC parameter is less than zero at block 318, module 120 can conclude that there is insufficient available storage capacity for admitting object O in view of the reserved storage capacity and thus can deny/block the provisioning/reconfiguration request (block 320). Workflow 300 can subsequently end.

Figure 4:
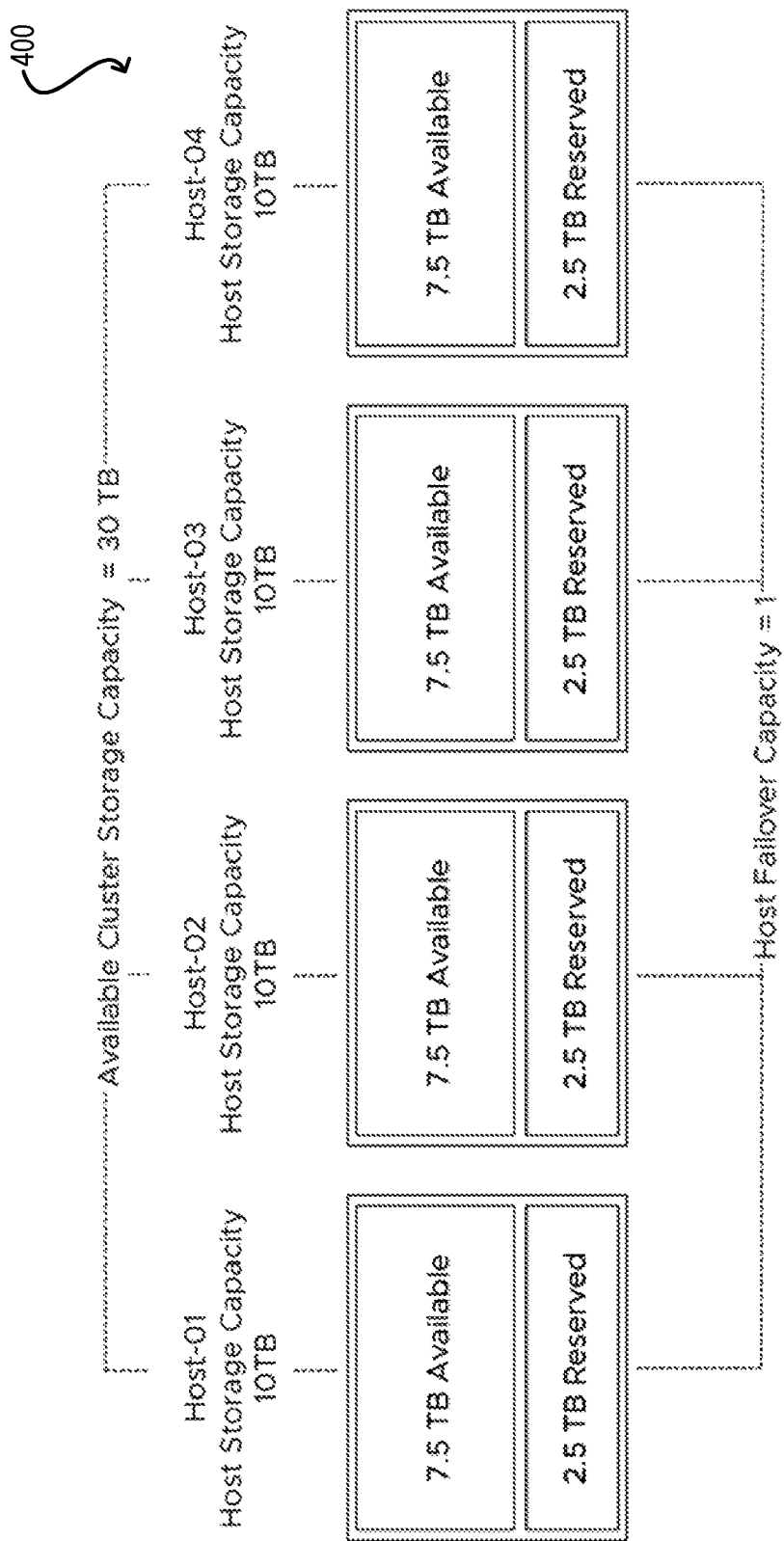
FIGS. 4 and 5 depict example clusters in which the workflow of FIG. 3 has been applied according to certain embodiments.
Figure 5:
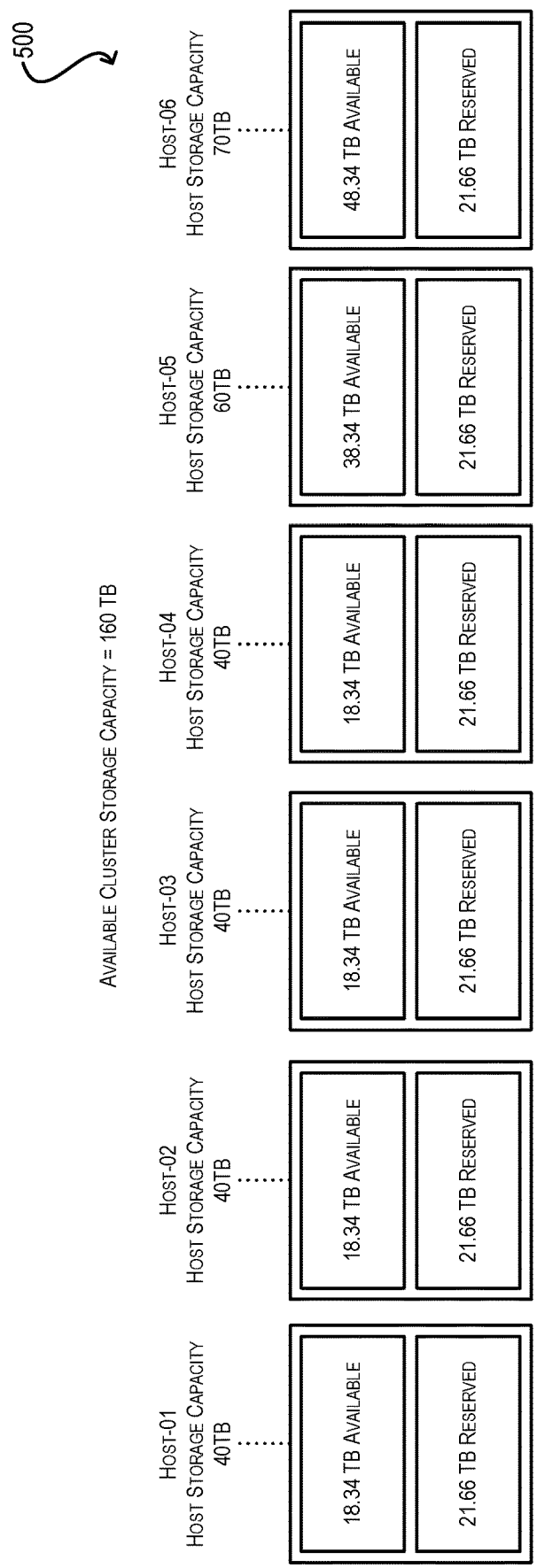

To further clarify the processing performed by storage capacity admission control module 120 in FIG. 3, FIGS. 4 and 5 depict two example clusters 400 and 500 respectively and illustrates the amount of storage capacity that will be reserved in each of these clusters in accordance with workflow 300.

With respect to FIG. 4, cluster 400 comprises four host systems 01, 02, 03, and 04, each of which includes 10 TB of raw storage capacity. Further, the HFC parameter is set to 1. Thus, in this scenario the amount of storage capacity that will be reserved per host system for resynchronization/reconstruction (i.e., the HFRC parameter) is ¼×10 TB=2.5 TB. This amount guarantees that even if one host system (which will have a maximum of 7.5 TB of data) fails or goes offline for maintenance, there will be sufficient reserved storage capacity on the remaining three host systems (i.e., 2.5 TB×3=7.5 TB) to successfully resynchronize or reconstruct the data from the failed host system on those other, still-operational host systems.

With respect to FIG. 5, cluster 500 comprises six host systems 01, 02, 03, 04, 05, and 06, where host systems 01-04 each includes 40 TB of raw storage capacity, host system 05 includes 60 TB of raw storage capacity, and host system 06 includes 70 TB of raw storage capacity. Further, the HFC parameter is set to 2. Thus, in this scenario the amount of storage capacity that will be reserved per host system for resynchronization/reconstruction (i.e., the HFRC parameter) will be (⅙×70 TB=11.66 TB)+(⅙×60 TB=10 TB)=21.66 TB. This amount guarantees that even if the two largest host systems 06 and 05 (which will have a combined maximum of 48.34 TB+38.34 TB=86.68 TB of data) fail or go offline for maintenance, there will be sufficient reserved storage capacity on the remaining four host systems 01-04 (i.e., 21.66 TB×4=86.66 TB) to successfully resynchronize or reconstruct the data from the failed host systems on those other, still-operational host systems.

4. Object-Level Approach

In contrast to the host-level approach (which determines the amount of storage capacity to reserve for resynchronization/reconstruction based on the HFC parameter described above), the object-level approach determines the amount of storage capacity to reserve for resynchronization/reconstruction on a per-object basis based on an object-specific failures to tolerate (FTT) parameter. This FTT parameter is typically defined within an object's storage policy and indicates the level of availability desired for that object.

For example, assume the FTT parameter for an object O1 is set to 1 and the size of O1 is 35 GB. In this case, using the object-level approach, storage capacity admission control module 120 will reserve a total of 35 GB of storage capacity across cluster 104 for O1 in order to resynchronize/reconstruct this particular object. As another example, assume the FTT parameter for an object O2 is set to 2, the size of O2 is 25 GB, and O2 is configured to be mirrored according to a RAID-1 configuration. In this case, using the object-level approach, storage capacity admission control module 120 will reserve a total 50 GB (i.e., 25 GB×2) of storage capacity across cluster 104 for O2 in order to resynchronize/reconstruct this particular object, because O2 may potentially need to be resynchronized/reconstructed twice (in order to recover from two failures).

In certain embodiments, the storage reservations that are determined for a given object via the object-level approach will only be applied to the host systems of the cluster that do not currently store (or are slated to store) components of that object on their local storage. These host systems are referred to as "unused" host systems with respect to the object. This rule ensures that a full rebuild of the object in compliance with fault tolerant RAID mirroring/striping is possible. Accordingly, in these embodiments, the object-level approach will not reserve any storage capacity for resynchronizing/reconstructing an object on host systems where components of the object are already placed (or are planned to be placed).

Figure 6:
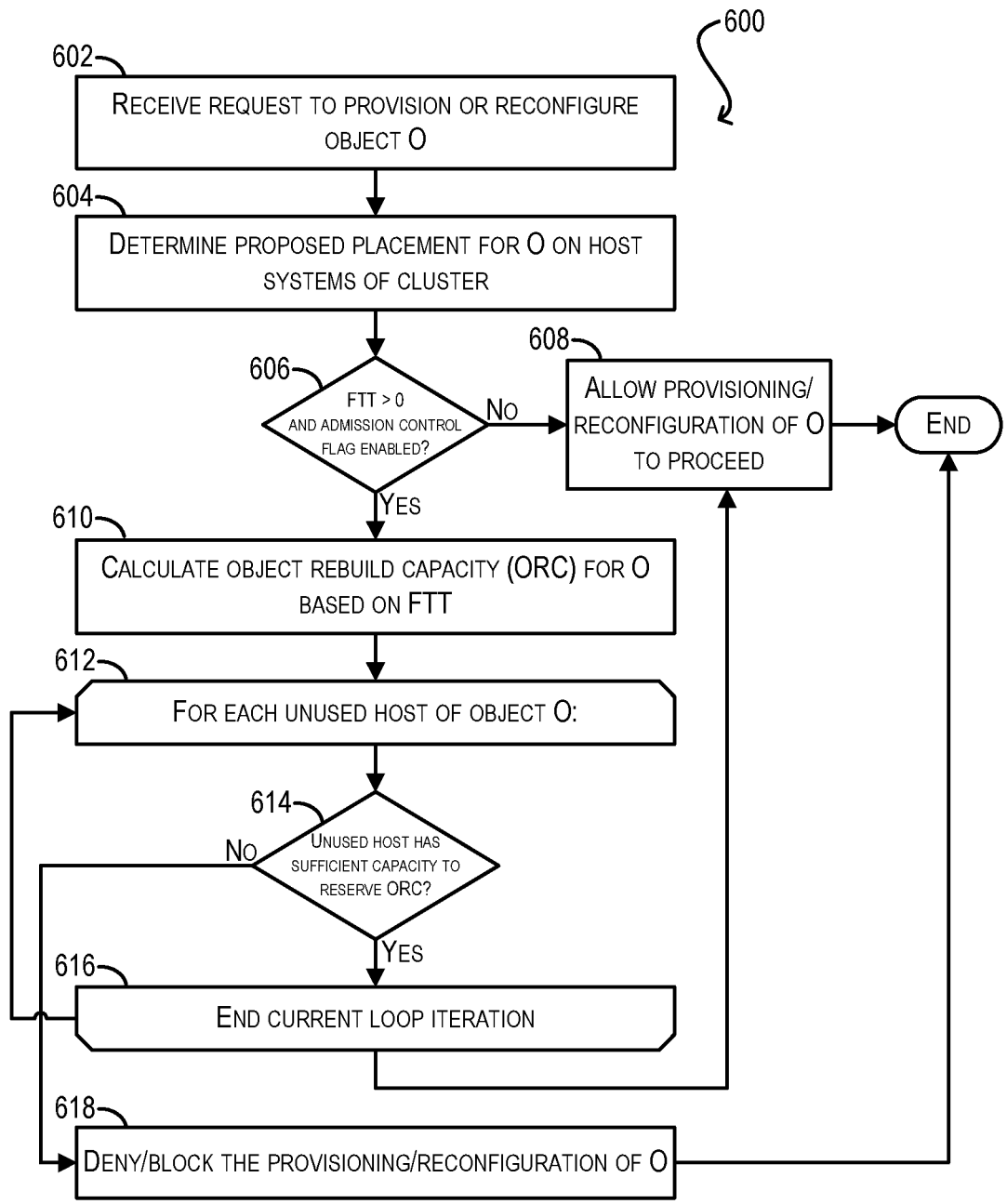
FIG. 6 depicts a workflow for implementing storage capacity admission control using an object-level approach according to certain embodiments.

FIG. 6 depicts a workflow 600 that can be executed by storage capacity admission control module 120 of FIG. 1 for validating the admittance of a given object O into cluster 104's virtual storage pool 118 using the object-level approach according to certain embodiments. Like workflow 300 of FIG. 3, object O may be, e.g., a VM namespace object, a VMDK object, or any other type of object supported by HCI deployment 100.

Starting with blocks 602 and 604, a request to provision or reconfigure object O can be received and a proposed placement for object O (and its constituent components) on the host systems of cluster 104 can be determined based on O's requested storage size and its storage policy. These steps are substantially similar to block 302 and 304 of workflow 300.

At block 606, storage capacity admission control module 120 can check whether (1) the FTT parameter for object O is greater than zero and (2) a storage capacity admission control flag is enabled at the cluster level. In various embodiments, the storage capacity admission control flag is an user-defined flag that indicates whether the functionality of module 120 should be enabled or disabled. If the answer to either (1) or (2) is no, storage capacity admission control module 120 can allow the provisioning/reconfiguration of object to proceed (block 608) the workflow can end.

Otherwise, at block 610 storage capacity admission control module 120 can calculate an object rebuild capacity (ORC) parameter for object O as follows:

$$ORC = \frac{\text{object size} \times FTT \text{ overhead}}{\text{total number of unused hosts}} \quad \text{Listing 2}$$

In the equation above, object size refers to the storage size of object O, total number of unused hosts refers to the number of host systems where no components of object O are currently placed (or will be placed per the proposed placement of block 604), and FTT overhead is a parameter that corresponds to the percentage/proportion of the object size that should be reserved based on the object's FTT parameter value and RAID configuration. For example, the following table lists various combinations of FTT parameter values/RAID configurations and their respective FTT overheads according to an embodiment:

TABLE 1

| FTT Parameter Value/ RAID Configuration | FTT Overhead |
| --- | --- |
| FTT = 1/RAID-1 | 100% |
| FTT = 2/RAID-1 | 200% |
| FTT = 3/RAID-1 | 300% |
| FTT = 1/RAID-5 | 33% |
| FTT = 2/RAID-6 | 50% |

Once the ORC parameter has been calculated, storage capacity admission control module 120 can enter a loop for each unused host (block 612) and check whether the current unused host has sufficient available storage capacity to reserve an amount of storage equal to the ORC value (or in other words, whether the available storage capacity for the unused host—ORC is greater than or equal to zero) (block 614). If the answer is yes, the end of the current loop iteration can be reached (block 616) and module 120 can return to the top of the loop to process any additional unused hosts. If the answer at block 614 is no, storage capacity admission control module 120 can block/deny the provisioning/reconfiguration of object O (block 618) and terminate the workflow.

Finally, assuming all of the unused hosts of object O have been processed per loop 612 and have available storage capacity to reserve the ORC, storage capacity admission control module 120 can allow the provisioning/reconfiguration object O to proceed per previously identified block 608 and workflow 600 can end.

Figure 7:
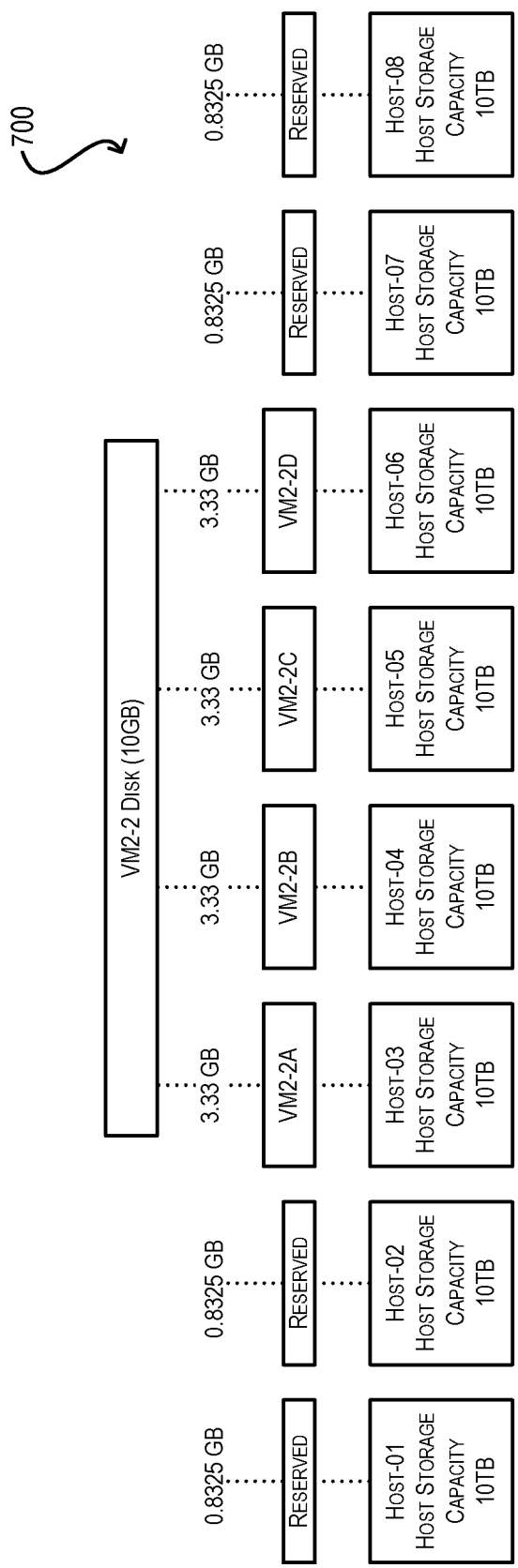
FIG. 7 depicts an example cluster in which the workflow of FIG. 6 has been applied according to certain embodiments.

FIG. 7 depicts a cluster 700 that illustrates how workflow 700 may be applied to reserve storage capacity in the cluster with respect to an example VMDK object "VM2-2" according to certain embodiments. As shown, cluster 700 comprises eight host systems 01-08, each having a storage capacity of 10 TB. In addition, object VM2-2 has a total storage size of 10 GB, is associated with a FTT parameter value of 1, and is made up of four components VM2-2A, VM2-2B, VM2-2C, and VM2-2D in a RAID-5 configuration (three data block components and one parity block component, each with a size of 3.33 TB) placed on host systems 03, 04, 05, and 06 respectively.

In this example, because object VM2-2 has an FTT parameter value of 1 and uses RAID-5, the FTT overhead of this object (per Table 1 above) is 33%. Thus, in accordance with the processing of workflow 600, (10 GB×33%)/4=0.8325 GB of storage space will be reserved for reconstructing VM2-2 on hosts 01, 02, 07, and 08 respectively (which are the unused host systems for object VM2-2).

It should be noted that in cases where an object employs a series of nested RAID configurations (e.g., RAID-1 under RAID-0), workflow 600 of FIG. 6 may only be applied to the lowest level RAID configuration in the series. Stated another way, if the object has a first-level RAID configuration with an assigned FTT value of X and a second-level RAID configuration nested under the second-level RAID configuration with an assigned FTT value of Y, workflow 600 will only take into account FTT value Y and the second-level RAID configuration. This is to ensure that a rebuild/reconstruction of the object is possible within every branch of the object's RAID tree.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a general-purpose computer system selectively activated or configured by program code stored in the computer system. In particular, various general-purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid-state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while certain virtualization methods referenced herein have generally assumed that virtual machines present interfaces consistent with a particular hardware system, persons of ordinary skill in the art will recognize that the methods referenced can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for ensuring sufficient available storage capacity for data resynchronization or data reconstruction in a cluster of a hyper-converged infrastructure (HCI) deployment, the method comprising:

receiving, by a computer system, a request to provision or reconfigure an object on the cluster, the object comprising a plurality of components in accordance with a storage policy associated with the object;

determining, by the computer system in response to the request, a proposed placement of the object on local storage resources of one or more first host systems in the cluster, the proposed placement being based on the storage policy and including a mapping between each component in the plurality of components and each of the one or more first host systems;

calculating, by the computer system, one or more storage capacity reservations for one or more second host systems in the cluster, the one or more storage capacity reservations indicating one or more amounts of local storage capacity to reserve on local storage resources of the one or more second host systems respectively in order to ensure successful data resynchronization or data reconstruction in case of a host system failure or maintenance event; and if the proposed placement of the object will result in a conflict with the one or more storage capacity reservations, denying the request to provision or reconfigure the object.

2. The method of claim 1 further comprising:
if the proposed placement of the object will not result in a conflict with the one or more storage capacity reservations, allowing the request to proceed.

3. The method of claim 1 wherein calculating the one or more storage capacity reservations comprises:
determining a host failover capacity (HFC) parameter associated with the cluster, the HFC parameter indicating a number of host system failures that should be tolerated within the cluster;
identifying a number of host systems in the cluster with highest raw storage capacity, the number corresponding to the HFC parameter; and
calculating a host failure capacity reservation (HFCR) parameter for each of the one or more second host systems based on raw storage capacities of the number of host systems.

4. The method of claim 3 wherein the computer system determines whether the proposed placement of the object will result in a conflict with the one or more storage capacity reservations by:
calculating a host failure storage capacity parameter (HFSC) based on the HFCR parameter;
calculating an amount of available storage capacity in the cluster based on the HFSC parameter; and
determining whether the amount of available storage capacity in the cluster is greater than or equal to zero.

5. The method of claim 4 wherein the calculated amount of available storage capacity in the cluster takes into account the proposed placement of the object.

6. The method of claim 1 wherein calculating the one or more storage capacity reservations comprises:
determining a failures to tolerate (FTT) parameter defined in the storage policy associated with the object, the FTT parameter indicating a desired level of availability for the object; and
calculating an object rebuild capacity (ORC) parameter for the object based on the FTT parameter and a RAID (Redundant Array of Independent Disks) configuration of the object.

7. The method of claim 6 wherein the computer system determines whether the proposed placement of the object will result in a conflict with the one or more storage capacity reservations by:
checking, for each host system in the cluster that does not maintain a portion of the object in the host system's local storage resources, whether the host system has sufficient available storage capacity to reserve an amount of storage capacity equal to the ORC parameter.

8. A non-transitory computer readable storage medium having stored thereon program code executable by a computer system, the program code embodying a method for ensuring sufficient available storage capacity for data resynchronization or data reconstruction in a cluster of a hyperconverged infrastructure (HCI) deployment, the method comprising:
receiving a request to provision or reconfigure an object on the cluster, the object comprising a plurality of components in accordance with a storage policy associated with the object;
determining, in response to the request, a proposed placement of the object on local storage resources of one or more first host systems in the cluster, the proposed placement being based on the storage policy and including a mapping between each component in the plurality of components and each of the one or more first host systems;
calculating one or more storage capacity reservations for one or more second host systems in the cluster, the one or more storage capacity reservations indicating one or more amounts of local storage capacity to reserve on local storage resources on the one or more second host systems respectively in order to ensure successful data resynchronization or data reconstruction in case of a host system failure or maintenance event; and
if the proposed placement of the object will result in a conflict with the one or more storage capacity reservations, denying the request to provision or reconfigure the object.

9. The non-transitory computer readable storage medium of claim 8 wherein the method further comprises:
if the proposed placement of the object will not result in a conflict with the one or more storage capacity reservations, allowing the request to proceed.

10. The non-transitory computer readable storage medium of claim 8 wherein calculating the one or more storage capacity reservations comprises:
determining a host failover capacity (HFC) parameter associated with the cluster, the HFC parameter indicating a number of host system failures that should be tolerated within the cluster;
identifying a number of host systems in the cluster with highest raw storage capacity, the number corresponding to the HFC parameter; and
calculating a host failure capacity reservation (HFCR) parameter for each of the one or more second host systems based on raw storage capacities of the number of host systems.

11. The non-transitory computer readable storage medium of claim 10 wherein the computer system determines whether the proposed placement of the object will result in a conflict with the one or more storage capacity reservations by:
calculating a host failure storage capacity parameter (HFSC) based on the HFCR parameter;
calculating an amount of available storage capacity in the cluster based on the HFSC parameter; and
determining whether the amount of available storage capacity in the cluster is greater than or equal to zero.

12. The non-transitory computer readable storage medium of claim 11 wherein the calculated amount of available storage capacity in the cluster takes into account the proposed placement of the object.

13. The non-transitory computer readable storage medium of claim 8 wherein calculating the one or more storage capacity reservations comprises:
determining a failures to tolerate (FTT) parameter defined in the storage policy associated with the object, the FTT parameter indicating a desired level of availability for the object; and
calculating an object rebuild capacity (ORC) parameter for the object based on the FTT parameter and a RAID (Redundant Array of Independent Disks) configuration of the object.

14. The non-transitory computer readable storage medium of claim 13 wherein the computer system determines whether the proposed placement of the object will result in a conflict with the one or more storage capacity reservations by:

checking, for each host system in the cluster that does not maintain a portion of the object in the host system's local storage resources, whether the host system has sufficient available storage capacity to reserve an amount of storage capacity equal to the ORC parameter.

15. A computer system comprising:
a processor; and
a non-transitory computer readable medium having stored thereon program code that, when executed, causes the processor to:
   receive a request to provision or reconfigure an object on a cluster of a hyper-converged infrastructure (HCI) deployment, the object comprising a plurality of components in accordance with a storage policy associated with the object;
   determine, in response to the request, a proposed placement of the object on local storage resources of one or more first host systems in the cluster, the proposed placement being based on the storage policy and including a mapping between each component in the plurality of components and each of the one or more first host systems;
   calculate one or more storage capacity reservations for one or more second host systems in the cluster, the one or more storage capacity reservations indicating one or more amounts of local storage capacity to reserve on local storage resources of the one or more second host systems respectively in order to ensure successful data resynchronization or data reconstruction in case of a host system failure or maintenance event; and
   if the proposed placement of the object will result in a conflict with the one or more storage capacity reservations, deny the request to provision or reconfigure the object.

16. The computer system of claim 15 wherein the program code further causes the processor to:
   if the proposed placement of the object will not result in a conflict with the one or more storage capacity reservations, allow the request to proceed.

17. The computer system of claim 15 wherein calculating the one or more storage capacity reservations comprises:
   determining a host failover capacity (HFC) parameter associated with the cluster, the HFC parameter indicating a number of host system failures that should be tolerated within the cluster;
   identifying a number of host systems in the cluster with highest raw storage capacity, the number corresponding to the HFC parameter; and
   calculating a host failure capacity reservation (HFCR) parameter for each of the one or more second host systems based on raw storage capacities of the number of host systems.

18. The computer system of claim 17 wherein the processor determines whether the proposed placement of the object will result in a conflict with the one or more storage capacity reservations by:
   calculating a host failure storage capacity parameter (HFSC) based on the HFCR parameter;
   calculating an amount of available storage capacity in the cluster based on the HFSC parameter; and
   determining whether the amount of available storage capacity in the cluster is greater than or equal to zero.

19. The computer system of claim 18 wherein the calculated amount of available storage capacity in the cluster takes into account the proposed placement of the object.

20. The computer system of claim 15 wherein calculating the one or more storage capacity reservations comprises:
   determining a failures to tolerate (FTT) parameter defined in the storage policy associated with the object, the FTT parameter indicating a desired level of availability for the object; and
   calculating an object rebuild capacity (ORC) parameter for the object based on the FTT parameter and a RAID (Redundant Array of Independent Disks) configuration of the object.

21. The computer system of claim 20 wherein the processor determines whether the proposed placement of the object will result in a conflict with the one or more storage capacity reservations by:
   checking, for each host system in the cluster that does not maintain a portion of the object in the host system's local storage resources, whether the host system has sufficient available storage capacity to reserve an amount of storage capacity equal to the ORC parameter.

* * * * *